United States Patent [19]

Knoll

[11] 4,290,721

[45] Sep. 22, 1981

[54] TOOL HOLDER ASSEMBLY FOR A PORTABLE POWER TOOL

[76] Inventor: Fritz Knoll, Konradigasse 21, D-7750 Constance, Fed. Rep. of Germany

[21] Appl. No.: 87,486

[22] Filed: Oct. 23, 1979

[30] Foreign Application Priority Data

Nov. 6, 1978 [CH] Switzerland ............... 11408/78

[51] Int. Cl.³ .................. B23C 1/20; B23B 31/00
[52] U.S. Cl. ......................... 409/234; 30/275; 83/824; 279/19; 408/239 R
[58] Field of Search ............ 279/19, 19.6; 409/234, 409/232; 83/635, 824; 29/76 A; 408/239 R; 308/3 A, 3 R; 30/289, 275, 272 A

[56] References Cited

U.S. PATENT DOCUMENTS

| | | | |
|---|---|---|---|
| 1,665,496 | 4/1928 | Hansen | 229/19 |
| 1,923,834 | 8/1933 | Lefkowitz et al. | 30/275 |
| 2,048,757 | 7/1936 | Smith, Sr. | 308/3 R |
| 2,200,746 | 5/1940 | Hoskwith | 30/275 |
| 2,659,969 | 11/1953 | Merkur | 30/275 X |
| 3,146,810 | 9/1964 | Keesling | 83/824 X |
| 3,650,576 | 3/1972 | Hughes | 308/3 A |

*Primary Examiner*—William R. Briggs
*Attorney, Agent, or Firm*—Spencer & Kaye

[57] ABSTRACT

A toolholder assembly incorporated in a portable power tool having a housing and a drive disposed therein. The assembly includes a toolholder body, a first releasable securing arrangement for attaching the toolholder body to the drive for oscillating the toolholder body in a longitudinal direction; a second releasable securing arrangement at the front end of the toolholder body for attaching a tool bit to the toolholder body, longitudinal guide faces provided on the toolholder body between the two releasable securing arrangements and a bearing member mounted in the housing and provided with longitudinal counterguide faces which slidably cooperate with the longitudinal guide faces of the toolholder body for taking up forces transverse to the direction of the longitudinal oscillation of the toolholder body.

10 Claims, 7 Drawing Figures

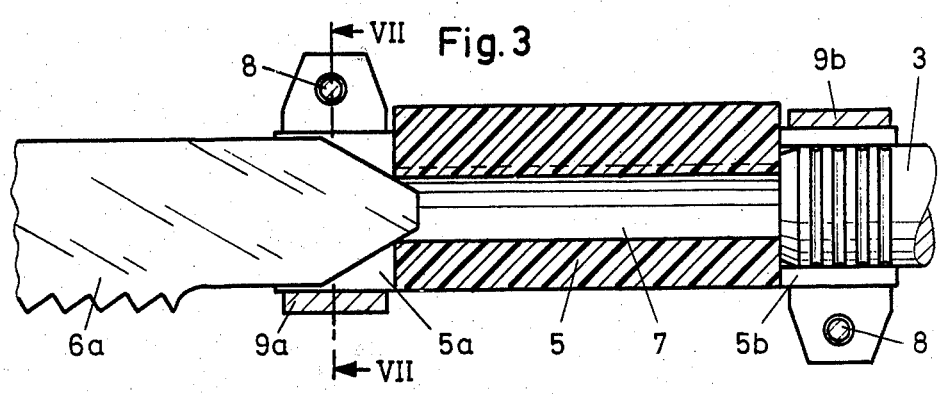
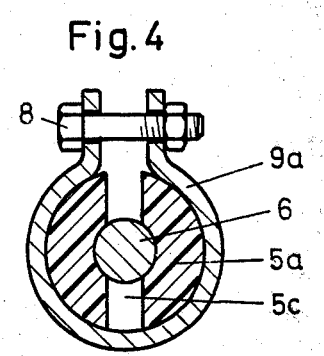
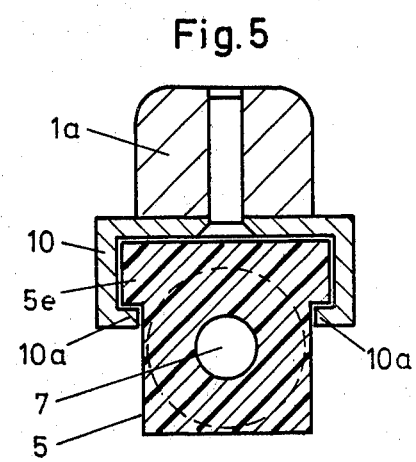
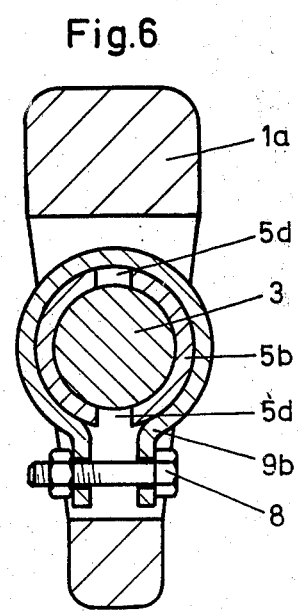
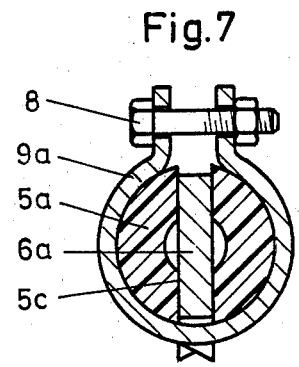

TOOL HOLDER ASSEMBLY FOR A PORTABLE POWER TOOL

BACKGROUND OF THE INVENTION

This invention relates to a toolholder assembly for a portable power tool for filing, sawing or polishing workpieces. The power tool has a motor-driven actuating element which executes oscillating motions in the length dimension of the tool, a toolholder body for carrying a file, a saw blade, or the like (hereafter referred to as tool bit) and a securing arrangement disposed on a rear portion of the toolholder body for releasably positioning it in the power tool.

In known portable power tools operating with rotating tool bits, such as hand-held drills, particularly in the longitudinal direction of the tool bit, forces are generated which can be readily taken up by a thrust bearing arranged in the tool housing. In portable filing, sawing or polishing tools whose tool bit is oscillated in their length dimension by means of a pneumatic motor or an electric motor, during the engagement with the workpiece forces are generated which are oriented transversely to the oscillating motion of the tool bit and which likewise have to be taken up by the tool housing.

SUMMARY OF THE INVENTION

It is an object of the invention to provide an improved toolholder of the above-outlined type which provides for a simple securing of tool bits having a shaft of circular or flat cross section and in which reaction forces are transmitted by means of a bearing to the tool housing and further wherein the toolholder is readily replaceable without significant expense.

This object and others to become apparent as the specification progresses, are accomplished by the invention, according to which, briefly stated, the toolholder body has an additional releasable securing arrangement which is situated at the front end of the toolholder body and which is adapted to fixedly hold the rear terminus of a tool bit. Further, between the rear and frontal securing arrangements the toolholder body has longitudinal guide faces which are adapted to slide on counter-guide faces provided on a bearing member secured to the tool housing.

Expediently, the toolholder body is a thermoplastic, for example nylon-6,6, to ensure that the toolholder body has a small mass which is advantageous in oscillating motions and that the longitudinal guide faces of the toolholder body have good sliding properties.

BRIEF DESCRIPTION OF THE DRAWINGS

FIG. 3 is a sectional side elevational view of one part of the structure shown in FIG. 2, illustrating a different tool bit.

FIGS. 4, 5 and 6 are sectional views taken along lines IV—IV, V—V and VI—VI of FIG. 1.

FIG. 7 is a sectional view taken along the line VII—VII of FIG. 3.

DESCRIPTION OF THE PREFERRED EMBODIMENT

Figure 1:
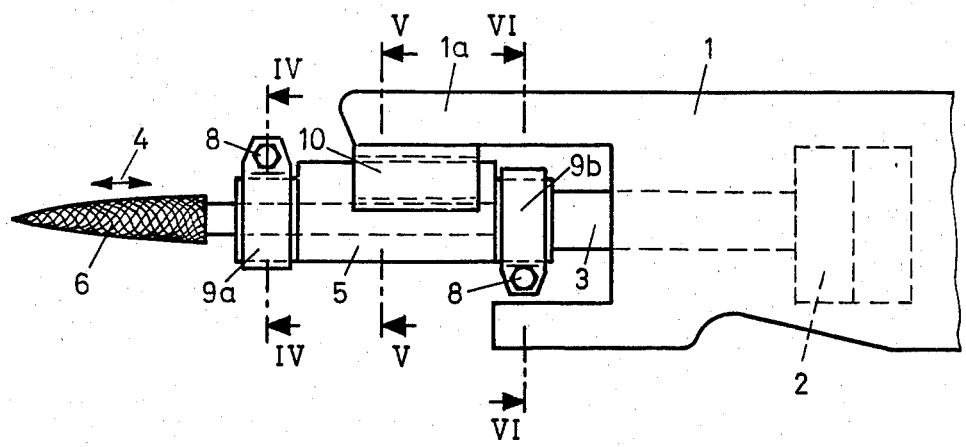
FIG. 1 is a side elevational view of the frontal part of a power tool incorporating a preferred embodiment of the invention.
Figure 2:
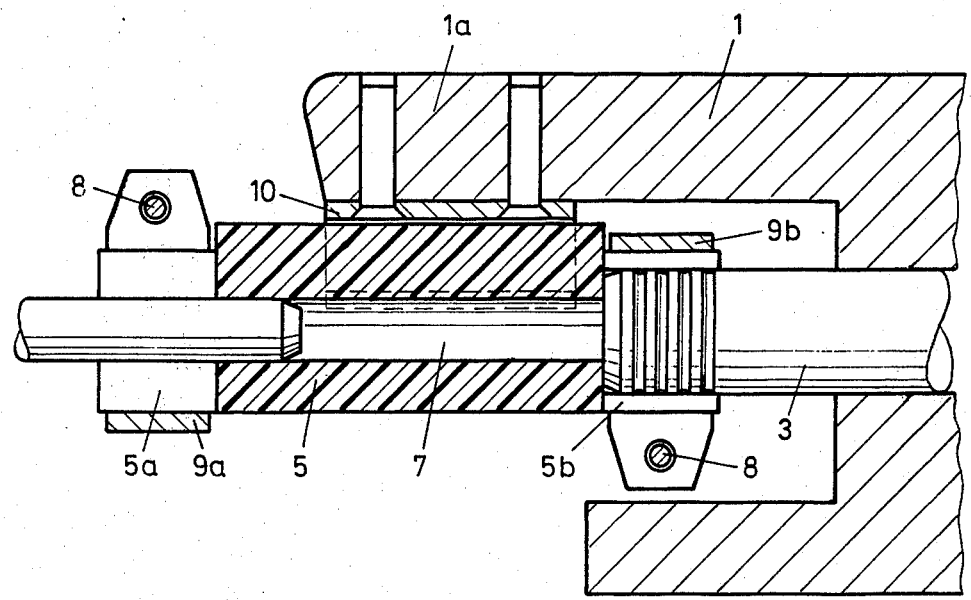
FIG. 2 is an enlarged sectional side elevational view of a detail of the structure shown in FIG. 1.

Turning now to FIGS. 1 and 2, there is shown a frontal housing portion 1 of a portable, pneumatically operated power tool for filing, sawing or polishing. The drive motor which is only symbolically shown by illustrating its piston 2, has a conventional structure which does not form part of the invention. The piston 2 imparts to the piston rod 3 a longitudinal oscillating motion which is indicated by the doubleheaded arrow 4. The piston rod 3 is connected to a toolholder body 5 which, at its front end, carries a tool bit such as a file 6.

The invention is particularly concerned with the structure of the toolholder body 5. It is made of synthetic material, preferably a thermoplastic, such as nylon-6,6. In the mid zone, the toolholder body has a T-shaped cross section as seen in FIG. 5. The frontal and rear terminus of the toolholder body are formed as respective cylindrical clamping sleeves 5a and 5b which both have respective vertical slots 5c and 5d as seen in FIGS. 4 and 6. The toolholder body 5 has a throughgoing bore 7 which serves for receiving the shaft of the file 6. The rear clamping sleeve 5b has a bore whose diameter corresponds to the diameter of the piston rod 3 which, in the zone of the clamping sleeve 5b is provided with circumferential grooves. Both clamping sleeves 5a and 5b are surrounded by respective clamping yokes 9a and 9b which can be tightened by means of tightening screws 8.

The housing 1 has a forwardly extending projection 1a to which there is secured a metal bearing member 10 which, as seen in FIG. 5, has a generally C-shaped cross section. The bearing member 10 has inwardly extending leg portions 10a which cooperate with the underside of the enlarged part 5e of the toolholder body 5. As seen, the bearing member 10 entirely surrounds the head part (enlargement) 5e of the T-shaped cross section of the toolholder body 5 and thus guides it on three sides, namely on the top, on the sides and at the underside. Thus, the bearing member 10 is adapted to take up any force which has a direction oriented transversely to the direction of motion of the file 6. As a result, the bearings (not shown) for the piston rod 3 in the inside of the housing 1 are not loaded by these forces. It is to be understood that the longitudinal guiding faces of the toolholder body may be shaped differently; what is of essence is that all forces which are transverse to the longitudinal direction of motion of the file 6 are taken up by the bearing member and further that the toolholder body is secured against rotation. Preferably the length of the toolholder body portion of T cross section (on which the guide faces are provided) is at least one half the length of the entire toolholder body 5, including the clamping sleeves 5a, 5b.

As seen particularly in FIGS. 3 and 7, by providing the slot 5c, tool bits having shafts of flat, rectangular cross section, such as saw blades 6a may be clamped in the tool.

The toolholder body is designed as a component exposed to wear; thus, after a predetermined amount of wear, it can be readily replaced by a new toolholder body after loosening the rearward clamping yoke 9b.

It will be understood that the above description of the present invention is susceptible to various modifications, changes and adaptations and the same are intended to be comprehended within the meaning and range of equivalents of the appended claims.

What is claimed is:

1. A toolholder assembly incorporated in a portable power tool having a housing and a drive means disposed therein comprising in combination:
   (a) a plastic toolholder body having a front end for carrying a tool bit;
   (b) a first clamping assembly at a rear end of the toolholder body for releasably securing the toolholder body to the drive means for oscillating the toolholder body in a longitudinal direction by the drive means; said first clamping assembly including
      (1) a first clamping yoke and
      (2) a first tightening screw carried by said first clamping yoke;
   (c) a second clamping assembly at said front end of said toolholder body for releasably securing a rear shank of the tool bit to said toolholder body; said second clamping assembly including
      (1) a second clamping yoke and
      (2) a second tightening screw carried by said second clamping yoke;
   (d) longitudinal guide faces provided on said toolholder body between said first and second releasable securing means; and
   (e) a bearing member mounted in said housing and provided with longitudinal counterguide faces slidably cooperating with said longitudinal guide faces of said toolholder body for taking up forces transverse to the direction of the longitudinal oscillation of said toolholder body.

2. In a toolholder assembly incorporated in a portable power tool having a housing and a drive means disposed therein; the assembly including a toolholder body having a front end for carrying a tool bit; first releasable securing means at a rear end of the toolholder body for attaching the toolholder body to the drive means for oscillating the toolholder body in a longitudinal direction by the drive means; the improvement wherein said toolholder body has a T-shaped cross section along a length portion thereof; the improvement further comprising
   (a) second releasable securing means at said front end of said toolholder body for attaching a rear shank of the tool bit to said toolholder body;
   (b) longitudinal guide faces provided on said toolholder body between said first and second releasable securing means; said longitudinal guide faces being situated in four planes defining the enlarged part of the T-shaped cross section; and
   (c) a bearing member mounted in said housing and provided with longitudinal counterguide faces slidably cooperating with said longitudinal guide faces of said toolholder body for taking up forces transverse to the direction of the longitudinal oscillation of said toolholder body.

3. A toolholder assembly as defined in claim 1 or 2, wherein said toolholder body is a thermoplastic.

4. A toolholder assembly as defined in claim 2, wherein said thermoplastic is nylon-6,6.

5. A toolholder assembly as defined in claim 2, wherein said first and second releasable securing means comprise, respectively, first and second clamping assemblies.

6. A toolholder assembly as defined in claim 5 or 1, wherein each said clamping assembly comprises a clamping sleeve forming terminal portions of said toolholder body; each said clamping sleeve being provided with at least one throughgoing radial slot for receiving tool bit shanks of flat cross section.

7. A toolholder assembly as defined in claim 5, wherein each said clamping assembly comprises a clamping yoke and a tightening screw carried by the respective clamping yoke.

8. A toolholder assembly as defined in claim 1, wherein said toolholder body has a T-shaped cross section along a length portion thereof; said longitudinal guide faces are situated in four planes defining the enlarged part of the T-shaped cross section.

9. A toolholder assembly as defined in claim 8 or 2, wherein said bearing member has a generally C-shaped cross section surrounding said enlarged part.

10. A toolholder assembly as defined in claim 8 or 2, wherein said first and second releasable securing means comprise, respectively, first and second clamping sleeves forming terminal portions of said toolholder body and further wherein the length of each said guide face is at least one half the length of the entire said toolholder body.

* * * * *